J. DEMENT.
Cultivator.
No. { 1,962, 32,966. }
Patented July 30, 1861
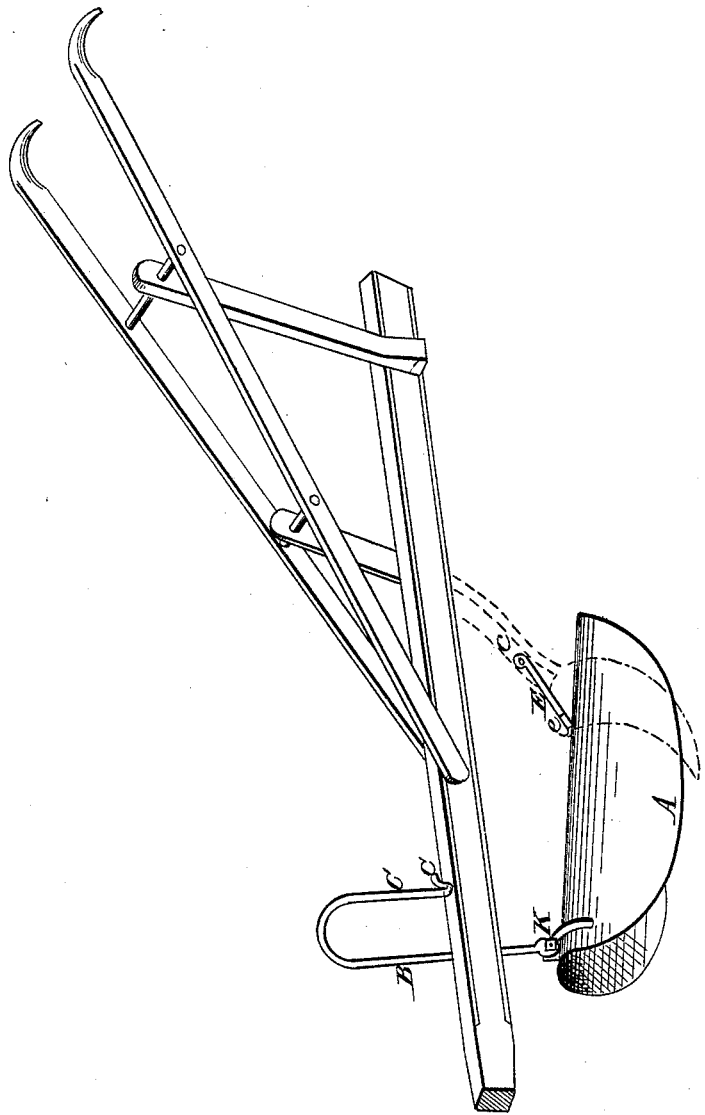
WITNESSES:
CMC Alexander
M. M. Dow
INVENTOR.
John Dement

UNITED STATES PATENT OFFICE.

JOHN DEMENT, OF DIXON, ILLINOIS.

IMPROVEMENT IN PLOWS.

Specification forming part of Letters Patent No. 32,966, dated July 30, 1861.

*To all whom it may concern:*

Be it known that I, JOHN DEMENT, of Dixon, in the county of Lee and State of Illinois, have invented certain new and useful Improvements in Constructing and Attaching Shields to Plows: and I do hereby declare that the following is a full, clear, and exact description of the same, reference being had to the accompanying drawings, and to the letters of reference marked thereon.

In the annexed drawings, making part of this specification, A represents the shield, which is made in the form represented, rounding off on the lower edge, as shown, something like a sleigh-runner at the front, and more rounding at the rear end, leaving the lower edge something like a chair-rocker. Said shield is seen in Figure 4. This shield is secured at its front end to the forward portion of the plow-beam, by means of a bar, B, which passes through the beam in the manner shown, and which is secured in proper position by means of a wedge, c. This bar B is secured to the shield by means of a hinge, as seen at K. The rear of the shield is connected to the shank to which the plow-blade is attached by means of a rod, E, which allows the rear of the shield to rise and fall in passing uneven ground or over stones. The rising and falling of the shield as it passes over uneven ground prevents it from clogging. The sides of the shield being smooth and having an up-and-down motion, said shield is not so likely to clog as it would were it shaped like the mold-board of a plow and perforated. In turning the plow or leaning it sidewise toward the shield, the joint or pivot allows the shield to yield, so as not be crushed or pressed into the ground.

Some of the advantages of this shield are the ease with which it relieves itself of earth thrown against it, its freedom from being strained, and its cheapness and simplicity of construction.

Having thus fully described my invention, I claim—

The arrangement of the shield A, the bar B, wedge c, and hinge K with the attachment E and shank to which the plow-blade is attached, in the manner and for the purpose herein specified.

JOHN DEMENT.

Witnesses:
M. H. WILLIAMS,
DWIGHT HEATON.